C. H. BISSELL & F. SMITH.
ELECTRIC CONDUIT FITTING.
APPLICATION FILED OCT. 6, 1910.
1,034,572.
Patented Aug. 6, 1912.
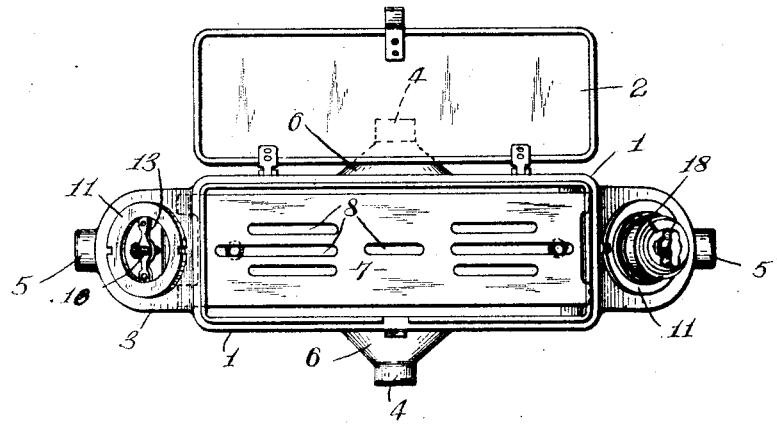
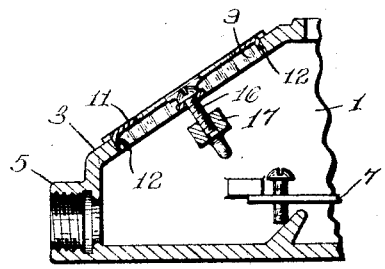
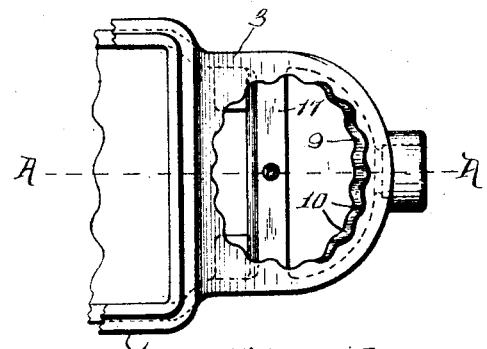
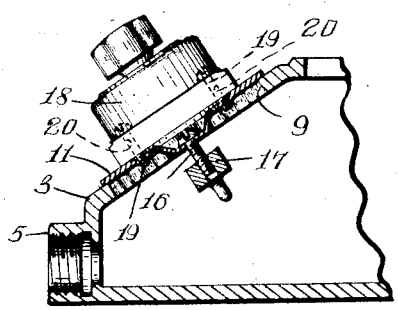
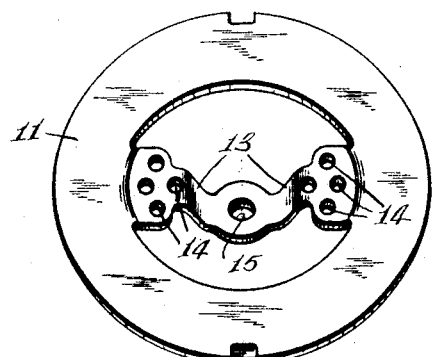
WITNESSES:
INVENTORS

UNITED STATES PATENT OFFICE.

CARL H. BISSELL AND FLOYD SMITH, OF SYRACUSE, NEW YORK, ASSIGNORS TO CROUSE-HINDS COMPANY, OF SYRACUSE, NEW YORK, A CORPORATION OF NEW YORK.

ELECTRIC-CONDUIT FITTING.

1,034,572.  Specification of Letters Patent.  Patented Aug. 6, 1912.

Application filed October 6, 1910. Serial No. 585,627.

*To all whom it may concern:*

Be it known that we, CARL H. BISSELL and FLOYD SMITH, of Syracuse, in the county of Onondaga and State of New York, have invented a certain new and useful Electric-Conduit Fitting, of which the following is a specification.

Our invention relates to electric conduit fittings, and has for its object the production of such a fitting which can be adapted to standard commercial electrical appliances of different makes and sizes, and it consists in the combinations and constructions hereinafter set forth and claimed.

In describing this invention, reference is had to the accompanying drawing in which like characters designate corresponding parts in all the views.

Figure 1 is a top plan of one form of our electric conduit fitting, the cover being open and an electrical appliance being mounted on one end of the fitting. Fig. 2 is a plan of an end portion of the fitting. Fig. 3 is a sectional view on the plane of line "A—A", Fig. 2, parts being included in Fig. 3 not shown in Fig. 2. Fig. 4 is a view similar to Fig. 3, showing an electrical appliance supported by the fitting. Fig. 5 is a detail view of the ring for supporting the appliance.

1 is the electric conduit fitting comprising a body or box having an open top, and a cover 2 for such top, and extensions 3 at its opposite ends. The body is preferably elongated and is provided with suitable nipples 4 extending from its sides by which connection is made with conduits, and also with other nipples 5 extending from its ends by means of which connection is made with other conduits. The nipples 4 are preferably formed funnel-shape at 6 at their bases for permitting spreading of the wires within the body and avoiding sharp bends in the wires. The body is also provided with means, as a plate 7, located therein for supporting electrical appliances, as cutouts connected to the wires within the body. This plate is removable through the open top and is of substantially the same size as the opening in the top and is provided with a plurality of slots 8 for receiving the fastening means as screws associated with electrical appliances or cutouts. The slots are employed instead of ordinary holes in order to permit the plate to support commercial cutouts of different sizes and makes.

As seen in Figs. 3 and 4, the top of each extension 3 is inclined toward the end of the body and is formed with a circular opening 9, and the edge of the top wall around the opening is formed with a plurality of notches 10 for a purpose to be explained. 11 is a plate formed with a central opening and having its outer margin seated on the margin of the top wall, the plate 11 partly closing the opening 9. As the opening 9 is circular, the plate 11 is in the form of a ring. The ring 11 is preferably formed of sheet metal and is provided with shoulders 12 struck therefrom and spaced apart for entering two of the notches 10. The ring 11 is also formed with a diametrically extending bridge 13 having a plurality of pairs of holes 14 near its ends and located different distances from the center of the ring, the holes of each pair being located diametrically opposite to each other. The central portion of the bridge is usually depressed and formed with an opening 15 located at the center of the ring and designed to receive a screw 16 which threads into a support as a bar 17 extending from one side wall of the extension 3 to the other, crosswise of the opening.

18 is an electrical appliance as a rotary switch mounted on the ring and secured thereto by a pair of screws 19 which enter one of the pairs of holes 14. By means of the ring, the fitting can be adapted to different sizes of switches, as for a large switch, a ring of smaller area is employed than when a smaller switch is used, and by reason of the holes 14 the ring is adapted to receive the screws 19 of the standard makes of switches now on the market, said screws being arranged in holes as 20 in the appliance, and in different makes of switches these holes are spaced different distances apart. Therefore, in order to adapt the fittings for different makes of switches, the holes 14 are so located from the center of the ring that one pair thereof will register with the openings 20 for the screws as 19 of the various commercial switches.

In the various commercial switches the indicator openings which show whether or not the switch is "on" or "off", do not always bear the same relative position, and therefore for the purpose of permitting the arrangement of the various commercial switches so that the indicator openings can be conveniently seen, the ring is adjustable about its axis and during such adjustment the shoulders 12 on the ring 11 are brought into position to enter predetermined notches 10.

In the use of the conduit fitting here illustrated, the wires pass through the nipples 4 and some of said wires may be connected, respectively, to cutouts mounted on the plate 7, and some wires may branch and be connected to the switches and then connected with wires in the conduits connected to the nipples 5, and other wires may pass directly through the box without connection with the cutouts or switches.

In this application we have claimed only the means for supporting and adjusting the electrical appliance 18, but additional features of our electric conduit fitting are claimed in our divisional application, Sr. No. 684,370, filed Mar. 18, 1912.

What we claim is:—

1. The combination of an electric conduit fitting comprising a hollow body having means for connection with a conduit, and a circular opening in one wall thereof, the edge of the wall around the opening being formed with notches, a ring resting on the margin of the wall around said opening and partly covering the opening, the ring being formed with means for engaging the notched edge of such margin, additional means for holding the ring in position, and an electrical appliance mounted on the ring, substantially as and for the purpose described.

2. The combination of an electric conduit fitting comprising a hollow body having means for connection with a conduit, and a circular opening in one wall thereof, the edge of the wall around said opening being formed with notches, a ring resting on the margin of the wall around said opening, and partly covering the opening, the ring being formed with shoulders spaced apart for engaging the notched edge of said margin, the ring being adjustable about its axis for bringing the shoulders into different notches, the ring also having a diametrically extending bridge piece, means extending through the bridge piece for clamping the ring in position, and an electrical appliance mounted on the ring, substantially as and for the purpose specified.

In testimony whereof, we have hereunto signed our names in the presence of two attesting witnesses, at Syracuse, in the county of Onondaga, in the State of New York, this 1st day of October, 1910.

CARL H. BISSELL.
   FLOYD SMITH.

Witnesses:
 C. C. SCHOENECK,
 LYNFORD J. WELLS.

---

Copies of this patent may be obtained for five cents each, by addressing the "Commissioner of Patents, Washington, D. C."